Patented May 28, 1935

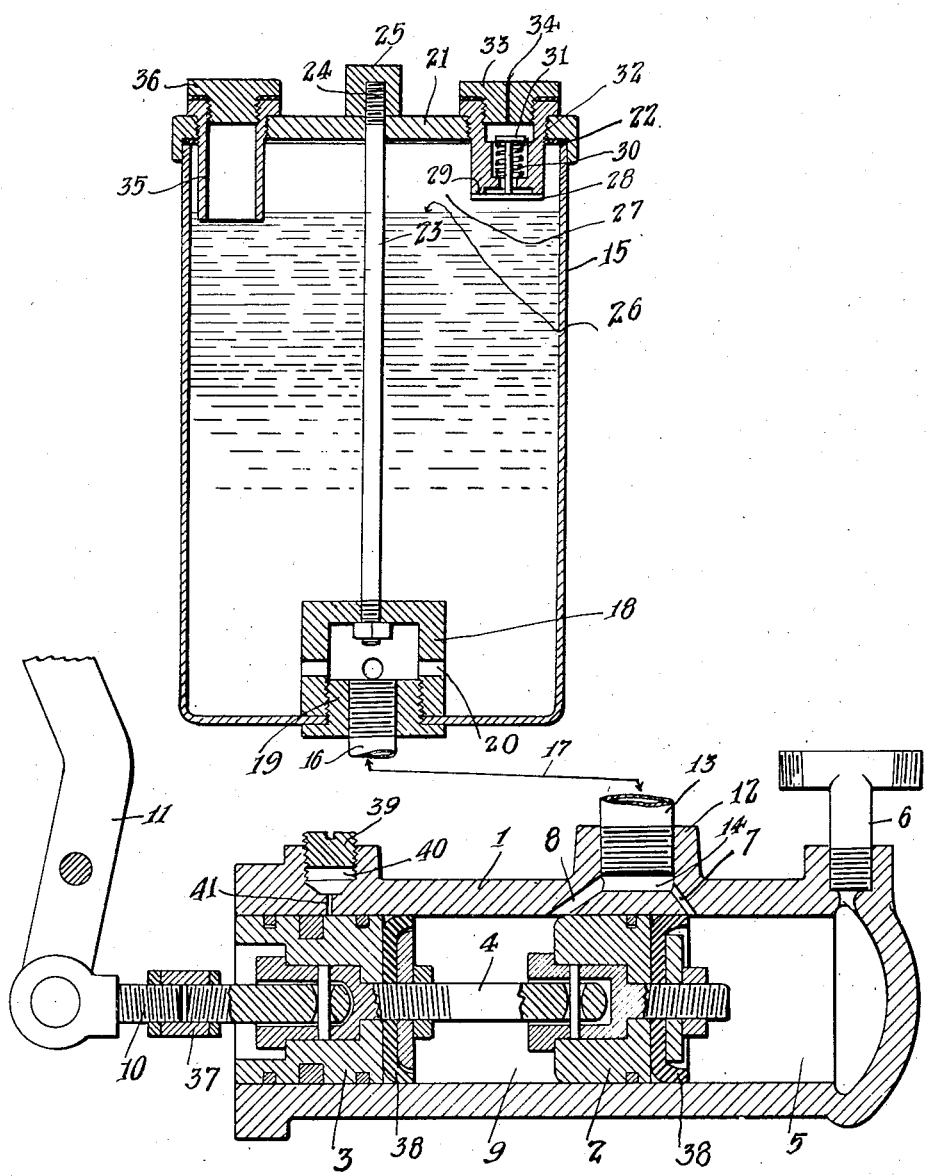

2,003,247

UNITED STATES PATENT OFFICE 2,003,247

HYDRAULIC BRAKE APPARATUS

Eugene G. Carroll, Los Angeles, Calif., assignor, by mesne assignments, to Bendix Brake Company, South Bend, Ind., a corporation of Illinois Application January 18, 1930, Serial No. 421,736

3 Claims. (Cl. 60—54.6)

This invention relates to hydraulic brake apparatus of the type disclosed in my Patent No. 1,770,064, dated July 8, 1930, now Reissue No. 19,432. This apparatus includes a master cylinder with foot-operated means for developing hydraulic pressure in the cylinder and for communicating the same to the hydraulic brake devices located at the automobile wheels. In the retracted position of the piston that develops the pressure in the hydraulic system to apply the brakes, in other words, in the position of rest of the piston, this piston is located just back of an inlet port which admits the operating fluid to the compression chamber, forward of the piston. A reservoir supplies the operating liquid to the cylinder at the inlet port. This insures that the compression chamber of the master cylinder and the pipe system and brake devices at the wheels will always be completely full of the operating liquid.

If a single piston is employed in a cylinder having a chamber back of the piston, closed from the atmosphere, a partial vacuum will be produced in the rear end of the master cylinder and in order to overcome this difficulty a by-pass port was provided leading around from the inlet port to the chamber back of the piston to keep this rear chamber full of liquid, and the rear chamber operated to catch any leakage of liquid past the piston. However, it was found that, as the compressing piston advances across the inlet port, even with the rear chamber full of the operating liquid, a partial vacuum is produced, causing a loss in pressure and tending to withdraw the operating liquid through the inlet port from the compression chamber, thereby entailing a loss in pressure as the compressing piston advances across the inlet port. In this way a loss in the volume of liquid in advance of the compressing piston occurred and an undesirable lost-motion effect occurred in the application of the brakes.

In my prior patent referred to above, I overcame this difficulty by providing a piston of larger diameter in the rear of the forward or compressing piston, and this rear piston developed pressure in a chamber of larger diameter, thereby causing a rise or a "boost" in the pressure of the liquid in the inlet port, operating to prevent efflux through this port, and perhaps actually causing an inflow of liquid through the inlet port into the compressing chamber as the forward piston advances.

The construction disclosed in my patent referred to above involved the use of a small chamber from which the inlet port led into the compression chamber, and into which a port from the rear, or booster, chamber admitted liquid from the rear chamber. The development of pressure in the rear chamber tended to develop a flow back to the reservoir; in order to insure the passage of the liquid from the rear chamber around to the forward or compression chamber and prevent any efflux of liquid through the inlet port, it was desirable to employ a valve in the by-pass connection between the two ports, although the use of such a valve was not essential with pistons of equal diameter.

The general object of this invention is to provide a simple construction for a master cylinder of this kind which will not necessitate the use of a valve in the by-pass connection, nor pistons of different diameters, but which will operate to prevent the development of a partial vacuum at the back of the compression piston as it advances.

A further object of the invention is to provide means for insuring a plentiful supply of operating liquid to the master cylinder and the connected hydraulic system in which it develops pressure for applying the brakes. In the practical operation of hydraulic brakes the liquid often becomes quite hot and may boil out of the reservoir. One of the objects of this invention is to provide an expansion reservoir which will operate to prevent this.

Further objects of the invention will appear hereinafter.

The invention consists in the novel parts and combinations of parts to be described hereinafter, all of which contribute to produce an efficient hydraulic brake apparatus.

A preferred embodiment of the invention is described in the following specification, while the broad scope of the invention is pointed out in the appended claims.

The drawing is a vertical section through a master cylinder embodying my invention and also showing a reservoir in vertical section indicated as connected to the master cylinder. This view also illustrates the pipe connection from the cylinder for connecting the same to the brake cylinders at the wheels, the operating pedal being illustrated broken away.

In practicing this invention I provide a master cylinder having two pistons of equal diameter mounted to move in the cylinder, with means connecting the same to enable them to be advanced in unison. I also provide means such as a foot-operated pedal for advancing the pistons to apply the brakes. These pistons have a position of rest in which the pistons are in their most retracted position and when in this position an inlet port provided in the master cylinder for admitting the operating liquid lies just in advance of the forward piston. This inlet port is also in communication with a by-pass connection that leads from it back into the interior of the cylinder back of the forward piston, and in front of the rear piston. With this organization of parts the advance of the rear piston with the forward piston prevents the development of a partial vacuum back of the advancing forward piston, thereby preventing efflux of the operating liquid from the inlet port into the rear chamber of the cylinder. A suitable pipe connection from the cylinder is provided for connecting the cylinder to the wheel brakes.

Referring more particularly to the parts, 1 represents a master cylinder provided with two pistons, namely a forward piston 2 and a rear piston 3, said pistons being of equal diameter and connected together by a connecting stem 4 so that they can be advanced in unison. The forward end of the cylinder has a compression chamber 5 which is provided with a suitable connection 6 for connecting it to the pipes that lead the operating liquid to the hydraulic brake devices for applying the brakes at the wheels.

In the position of rest in which the pistons are indicated in the drawing, the forward piston is located just back of an inlet port 7 that admits the operating liquid into the compression chamber 5. This inlet port is connected by a by-pass port 8 to the chamber 9 that is formed in the rear of the cylinder between the pistons. The pistons may be actuated in any suitable manner, preferably by means of an adjustable connection 10 connecting to the rear piston and this connection may be actuated by a foot pedal 11 of any suitable construction.

I prefer to supply the operating liquid to the inlet port by providing a boss 12 on the upper side of the cylinder at which a threaded pipe connection 13 may be attached, said ports 7 and 8 communicating with the chamber 14 formed within this boss.

A sufficient supply of the operating liquid is insured by providing a reservoir 15 having an outlet connection 16 in its bottom that is connected by a suitable pipe line, indicated by the line 17, to the connection 13. In order to insure that the operating liquid, such as oil, supplied to the master cylinder will be clean, I prefer to provide an outlet 18 in the form of a sleeve that screws down onto a bushing 19 set in the bottom of the reservoir and this sleeve is provided at an elevated point above the bottom with a plurality of outlet holes 20. The reservoir is constructed air-tight so as to enable a pressure to be developed within it slightly above atmospheric pressure. For this purpose the upper end of the reservoir is closed by a cover 21 that seats on a soft gasket 22 on the upper edge of the body of the reservoir and this cover may be forced down tight onto the gasket by means of a stem 23 that is connected at its lower end to the sleeve 18 and has threads 24 at its upper end to receive a nut 25 that screws onto these threads and seats on the upper face of the cover.

The liquid level in the reservoir is indicated at the line 26. In practice, if the liquid level 26 rises by reason of overheating the liquid, then the air chamber 27 will become smaller as the level 26 rises. This air chamber operates as an elastic cushion for the liquid to expand against. If on cooling, the pressure within the reservoir drops below atmospheric pressure, a small inlet valve 28 will open to admit more air to the reservoir.

This valve 28 comes upon its seat 29 by an upward movement and is normally held closed by a coil spring 30 received in the body of the valve and thrusting against a collar 31 on the upper end of the valve-stem 32. The upper end of the valve body is closed by a screw plug 33 provided with a small air inlet passage 34.

The operating fluid can be supplied to the reservoir 15 through an inlet bushing 35 provided with a removable air-tight screw plug or cap 36.

The connection 16 from the brake pedal to the pistons preferably includes an adjustable connection 37 of any suitable construction.

The pistons 2 and 3 are provided with cup leathers 38 on their forward faces. As these cup leathers are very efficient in preventing leakage, I provide means for lubricating the rubbing face of the piston 3. For this purpose I provide a removable oiling plug 39 in the cylinder wall that screws into a small oil cup 40 having an oil passage 41 leading down from it to the bore of the cylinder and just over the piston 3.

The lower end of the bushing 35 is below the level of the valve 28. This makes it impossible to fill the reservoir completely and insures the presence of air chamber 27.

In the operation of this apparatus, when the braking force is applied to the brake pedal, the pistons 2 and 3 are moved in unison toward the right end of the cylinder. As this movement occurs, the rear piston 3, following up the forward piston, prevents enlargement of the chamber 9 between the pistons and in this way prevents the development of a partial vacuum back of the piston 2. In this way it is impossible to develop any suction effect in the inlet port 7 which would have the effect of producing an efflux of liquid through this port into the rear chamber of the cylinder. Hence, as the piston 2 advances across the port 7, the pressure in this port and in the compression chamber 5 is maintained. As soon as the port 7 closes, due to the advance of the forward piston, the operating pressure in the compression chamber 5 is developed, and the brakes connected to the pipe connection 6 will be applied. On the return stroke, as the pistons arrive at their position of rest, the piston 2 uncovers the port 7 and reestablishes communication between the compression chamber 5 and the reservoir 15, insuring a plentiful supply of the operating liquid to the compression chamber.

In apparatus of this kind now used in practice, a relief valve is sometimes provided on the cover or head 21 to maintain this operating pressure at any point desired.

It is understood that the embodiment of the invention described herein is only one of the many embodiments this invention may take, and I do not wish to be limited in the practice of the invention, nor in the claims, to the particular embodiment set forth.

What I claim is:

1. In hydraulic brake apparatus for automobiles, the combination of a cylinder, two pistons of equal diameter mounted to move in the cylinder with means connecting the same for advancement in unison, means connected with the pistons for advancing the same to apply the brakes, said pistons having a position of rest and said cylinder having an inlet port for the operating fluid just in advance of the forward piston when in the said position of rest, and with a passage leading from the inlet port through the cylinder wall into the interior of the cylinder back of the forward piston, whereby the advance of the rear piston with the forward piston maintains a liquid seal back of the advancing forward piston, a pipe connection for connecting the forward end of the cylinder to the wheel brakes, and a reservoir for the operating liquid connected with the cylinder and supplying operating liquid to the said inlet port, said reservoir having a closed air chamber above the liquid level therein.

2. In hydraulic brake apparatus for automobiles, the combination of a cylinder, two pistons of equal diameter mounted to move in the cylinder with means connecting the same for advancement in unison, means connected with the pistons for advancing the same to apply the brakes, said pistons having a position of rest and said cylinder having an inlet port for the operating fluid just in advance of the forward piston when in the said position of rest, and with a passage leading from the inlet port through the cylinder wall into the interior of the cylinder back of the forward piston, whereby the advance of the rear piston with the forward piston maintains a liquid seal back of the advancing forward piston, a pipe connection for connecting the forward end of the cylinder to the wheel brakes, and a reservoir for the operating liquid connected with the cylinder and supplying operating liquid to the said inlet port, said reservoir having a closed air chamber above the liquid level therein and having a valve for admitting atmospheric air if the pressure falls below atmospheric pressure.

3. In hydraulic brake apparatus for automobiles, the combination of a cylinder, two pistons of equal diameter mounted to move in the cylinder with means connecting the same for advancement in unison, means connected with the pistons for advancing the same to apply the brakes, said pistons having a position of rest and said cylinder having an inlet port for the operating fluid just in advance of the forward piston when in the said position of rest, and with a passage leading from the inlet port through the wall of the cylinder into the interior of the cylinder back of the forward piston, whereby the advance of the rear piston with the forward piston maintains a liquid seal back of the advancing forward piston, a pipe connection for connecting the forward end of the cylinder to the wheel brakes, a reservoir for the operating liquid connected with the cylinder for supplying the operating liquid to the inlet port, said reservoir having an air chamber with an air check valve opening into the same from the atmosphere, and operating as a resilient cushion for the operating liquid.

EUGENE G. CARROLL.